(No Model.)

F. H. HOLTON.
ERASIVE RUBBER.

No. 328,779. Patented Oct. 20, 1885.

UNITED STATES PATENT OFFICE.

FRANCIS H. HOLTON, OF BROOKLYN, NEW YORK.

ERASIVE RUBBER.

SPECIFICATION forming part of Letters Patent No. 328,779, dated October 20, 1885.

Application filed September 28, 1885. Serial No. 178,331. (No model.)

*To all whom it may concern:*

Be it known that I, FRANCIS H. HOLTON, a citizen of the United States, residing at Brooklyn, county of Kings, and State of New York, have invented certain new and useful Improvements in Erasive Rubbers, fully described and represented in the following specification and the accompanying drawings, forming a part of the same.

This invention applies to that article of manufacture known in the trade as "erasive rubber," and which is usually sold in small masses, as blocks or tablets, suitable to be held conveniently in the hand.

The invention or improvement relates to the structural character of the rubber; and it consists in forming such blocks or tablets with alternate layers or strata of solid or compact and cellular or sponge rubber. A block or tablet of rubber having such a structural formation is shown in the accompanying drawings, where—

Figure 1:
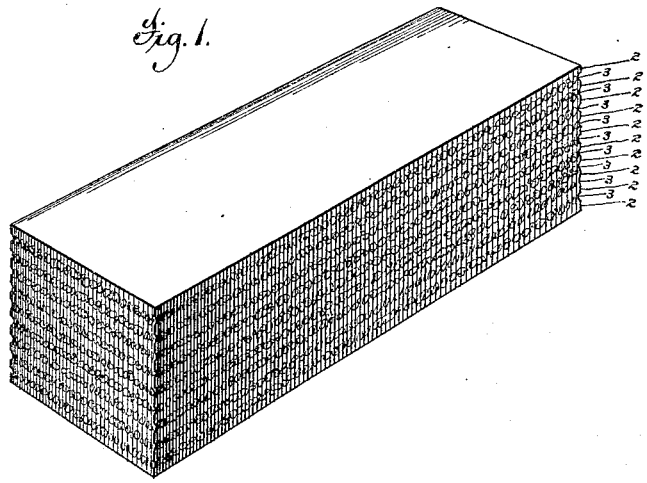
Figure 2:
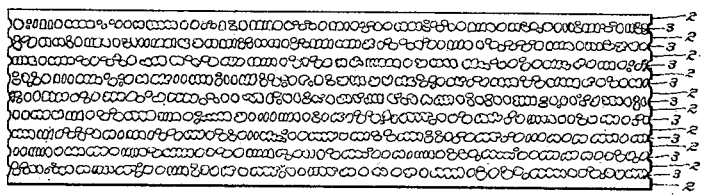

Figure 1 illustrates the same by a perspective view, and Fig. 2 by a longitudinal sectional view.

Heretofore erasive blocks or tablets of rubber have been formed from what is known as "solid" rubber, or such as has a finely-granulated and compact body, and such blocks or tablets have also been constructed of what is known as "sponge" rubber, or such as has a a cellular body. The solid granular or compact rubber is rigid enough to be forcibly applied for erasive purposes, and possesses to some degree, when fresh surfaces of it are exposed, that tacky quality which enables it to readily take hold of the surface to be cleaned of dirt, pencil or other marks; but it also possesses the disadvantage of readily glazing or becoming hard and smooth by reason of the action of the powder used in its vulcanization, and thus loses or has its erasive qualities modified in a large degree. Cellular or sponge rubber, while possessing the tacky quality in a large degree, also has the advantage of a soft yielding body not liable to become hard from exposure, and also of presenting numerous bearing-surfaces for contact with the surface to be cleansed; but as it readily wears away it has the disadvantages of quick destruction and of leaving the detached parts on the surface operated upon, thus necessitating a subsequent cleaning operation.

In practically carrying out the invention it is preferable to first prepare a number of sheets of rubber, each embodying in its composition any of the materials commonly employed to convert the same during the process of vulcanization into sponge-rubber, and then to build up a pile or body composed of any suitable number of such sheets, the contact-surfaces of these sheets being treated or not, as may be required, with cement to cause their adhesion. This pile or composite body is then subjected to the process of vulcanization, whereby the principal portion of each of the sheets is converted into sponge or cellular rubber, and the several sheets are united together to form one mass, presenting alternate strata, 2, of solid or compact rubber, and, 3, of sponge or cellular rubber. In thus carrying out the invention the solid or compact strata are formed by the surface portions of the sheets in contact, which, as a result of the vulcanizing process, retain that condition while the interior portion of each sheet is converted into cellular or sponge rubber. If, however, it is desired to increase the thickness of the strata of solid rubber, that may be done by introducing a sheet of rubber having appropriate thickness, but not provided with material for converting it into sponge-rubber, between sheets of rubber which are provided with material for converting them into sponge-rubber. The result then will be a block or mass of rubber still having alternate strata or layers of solid or compact and sponge or cellular rubber; but each stratum or layer of solid or compact rubber will be much thicker than the adjacent stratum or layer of cellular or sponge rubber, thus rendering the block or mass as a whole more substantial and rigid than when the first-described method of formation is adopted. The opposite effect may be produced for some grades of goods by making the sheets used in the first-described method suitably thick to cause the greater portion of the mass to be converted into sponge-rubber.

The solid or compact strata 2 may be made of the same quality of rubber as that composing the soft cellular or spongy strata, if desired, or they may be made more or less hard by proper treatment of the rubber composing them. Thus any composition may be introduced into the sheet—as powdered glass, whiting, clay, or other adulteration—or the sheet may be made of more or less pure gum.

The mass or block may be built up by rolling up a sheet charged with the material for converting it into sponge-rubber, whereby the mass, after vulcanization, will be composed of alternate strata of hard, compact, or solid strata, and soft, cellular, or sponge strata; or two sheets, one only of which is provided with the material for converting it into sponge-rubber, may in like manner be rolled up to form the mass or block.

By the present improvement the advantageous results due to both the solid compact rubber and to the cellular sponge rubber are obtained and their disadvantages are avoided. Enough of the solid compact rubber is present to impart rigidity to the mass, and such a large amount of cellular or sponge rubber is provided to cause numberless erasive surfaces to be presented to the article to be cleaned, said solid or compact portion acting to prevent the cellular portion from too speedily wearing away and enabling the block or tablet to be forcibly applied.

Of course any form may be given to the finished article, since it may be cast or cut into any shape desired.

The specific structure herein claimed is broadly covered by my companion application No. 152,125, filed January 6, 1885.

What is claimed is—

A block, tablet, or mass of rubber, composed of alternate layers or strata of solid and cellular rubber, substantially as described.

In testimony whereof I have hereunto set my hand in the presence of two subscribing witnesses.

F. H. HOLTON.

Witnesses:
  T. H. PALMER,
  GEO. H. GRAHAM.